US012757219B2

(12) United States Patent
Iscan et al.

(10) Patent No.: US 12,757,219 B2
(45) Date of Patent: *Oct. 6, 2026

(54) DOWNLINK CONTROL INFORMATION (DCI) TRANSMISSION AND RECEPTION

(71) Applicant: Apple Inc., Cupertino, CA (US)

(72) Inventors: Onurcan Iscan, Munich (DE); Tudor Ninacs, Munich (DE); Keith W Saints, San Diego, CA (US); Ruoheng Liu, San Diego, CA (US); Wenshu Zhang, Sunnyvale, CA (US); Amir Farajidana, Sunnyvale, CA (US); Amir Aminzadeh Gohari, Sunnyvale, CA (US); Dan Zhang, San Diego, CA (US); Herbert R Dawid, Herzogenrath (DE); Sami M Almalfouh, San Jose, CA (US); Sung Eun Lee, Sunnyvale, CA (US); Yihong Qi, Santa Clara, CA (US); Yuanye Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 18/476,966

(22) Filed: Sep. 28, 2023

(65) Prior Publication Data

US 2024/0023137 A1 Jan. 18, 2024

Related U.S. Application Data

(63) Continuation of application No. 18/302,355, filed on Apr. 18, 2023.

(60) Provisional application No. 63/363,396, filed on Apr. 22, 2022.

(51) Int. Cl.
*H04W 72/232* (2023.01)
*H04L 1/08* (2006.01)

(52) U.S. Cl.
CPC ............. *H04W 72/232* (2023.01); *H04L 1/08* (2013.01)

(58) Field of Classification Search
CPC ............... H04W 72/232; H04W 72/11; H04W 72/1273; H04L 1/08; H04L 1/1887
See application file for complete search history.

(56) References Cited

U.S. PATENT DOCUMENTS

2018/0167932 A1* 6/2018 Papasakellariou .... H04L 1/1887
2020/0028651 A1* 1/2020 Xu ........................ H04W 72/23
2022/0217694 A1* 7/2022 Kim ...................... H04L 1/1864
2022/0225368 A1* 7/2022 Khoshnevisan .. H04W 72/1273
2023/0156700 A1* 5/2023 Liu ....................... H04W 24/08
370/329

* cited by examiner

*Primary Examiner* — Fred A Casca
(74) *Attorney, Agent, or Firm* — Fay Kaplun & Marcin, LLP

(57) ABSTRACT

A user equipment (UE) is configured to receive physical downlink control channel (PDCCH) configuration information comprising repetitions for PDCCH candidates that comprise Downlink Control Information (DCI), receive PDCCH candidates and decode the PDCCH candidates based on the PDCCH configuration information. A UE is configured to receive semi-persistent scheduling (SPS) configuration information for a physical downlink shared channel (PDSCH), receive a PDSCH comprising Downlink Control Information (DCI) and decode the PDSCH comprising the DCI based on the SPS configuration information.

21 Claims, 6 Drawing Sheets

DOWNLINK CONTROL INFORMATION (DCI) TRANSMISSION AND RECEPTION

PRIORITY/INCORPORATION BY REFERENCE

This application claims priority to U.S. Provisional Application No. 63/363,396 filed on Apr. 22, 2022 and entitled "Downlink Control Information (DCI) Transmission and Reception," the entirety of which is incorporated herein by reference.

BACKGROUND

In New Radio (NR), Downlink Control Information (DCI) is transmitted to a user equipment (UE) via a Physical Downlink Control Channel (PDCCH). The decoding performance of the UE for the DCI is limited by a code rate (e.g., a message length and aggregation level). In typical NR networks, a Block Error Rate (BLER) of 0.1 (e.g., a highest acceptable BLER) is reached at approximately −11 dB. Attempting to decode the DCI below that level is not possible with existing solutions.

SUMMARY

Some exemplary embodiments are related to a processor of a user equipment (UE) configured to perform operations. The operations include receiving physical downlink control channel (PDCCH) configuration information comprising repetitions for PDCCH candidates that comprise Downlink Control Information (DCI), receiving PDCCH candidates and decoding the PDCCH candidates based on the PDCCH configuration information.

Other exemplary embodiments are related to a processor of a user equipment (UE) configured to perform operations. The operations include receiving semi-persistent scheduling (SPS) configuration information for a physical downlink shared channel (PDSCH), receiving a PDSCH comprising Downlink Control Information (DCI) and decoding the PDSCH comprising the DCI based on the SPS configuration information.

Still further exemplary embodiments are related to a processor of a base station configured to perform operations. The operations include transmitting, to a user equipment (UE), physical downlink control channel (PDCCH) configuration information comprising repetitions for PDCCH candidates that comprise Downlink Control Information (DCI), encoding, based on at least the PDCCH configuration information, PDCCH candidates comprising multiple repetitions and transmitting, to the UE, the encoded PDCCH candidates.

Additional exemplary embodiments are related to a processor of a base station configured to perform operations. The operations include transmitting, to a user equipment (UE), semi-persistent scheduling (SPS) configuration information for a physical downlink shared channel (PDSCH), encoding a PDSCH comprising Downlink Control Information (DCI) and transmitting, to the UE, the encoded PDSCH.

DETAILED DESCRIPTION

Figure 1:
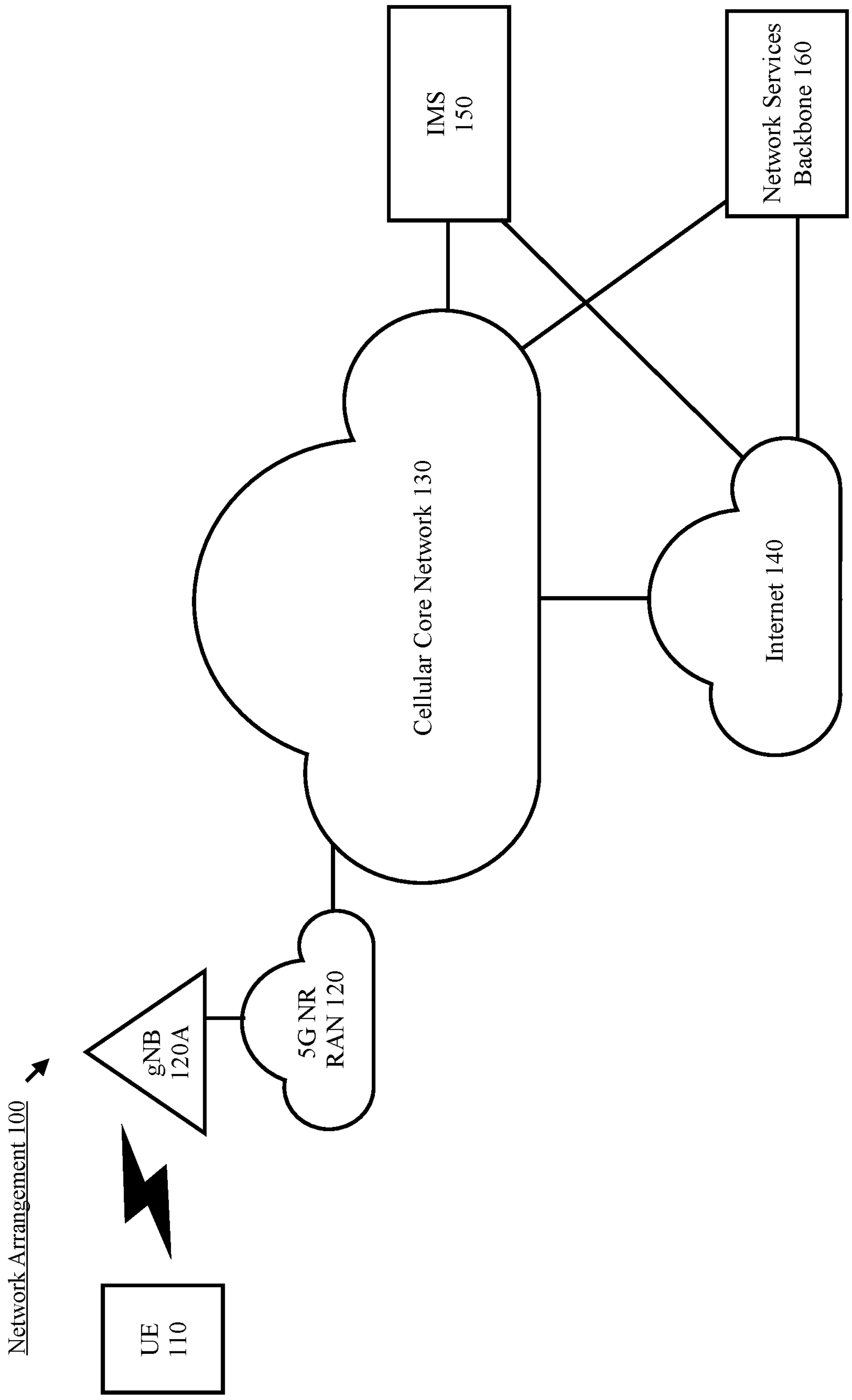
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments are related to improving the decoding of Downlink Control Information (DCI) at a user equipment (UE).

In one aspect the exemplary embodiments are related to transmitting multiple repetitions of DCI in the Physical Downlink Control Channel (PDCCH). In another aspect, the exemplary embodiments are related to configuring the UE to search and decode the multiple repetitions of the DCI in the PDCCH. In further aspects, the exemplary embodiments are related to transmitting the DCI in the Physical Downlink Shared Channel (PDSCH). In still additional aspects, the exemplary embodiments are related to methods to decode multiple repetitions of the DCI. Each of these aspects will be described in greater detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, I-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific base station, e.g., the gNB 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
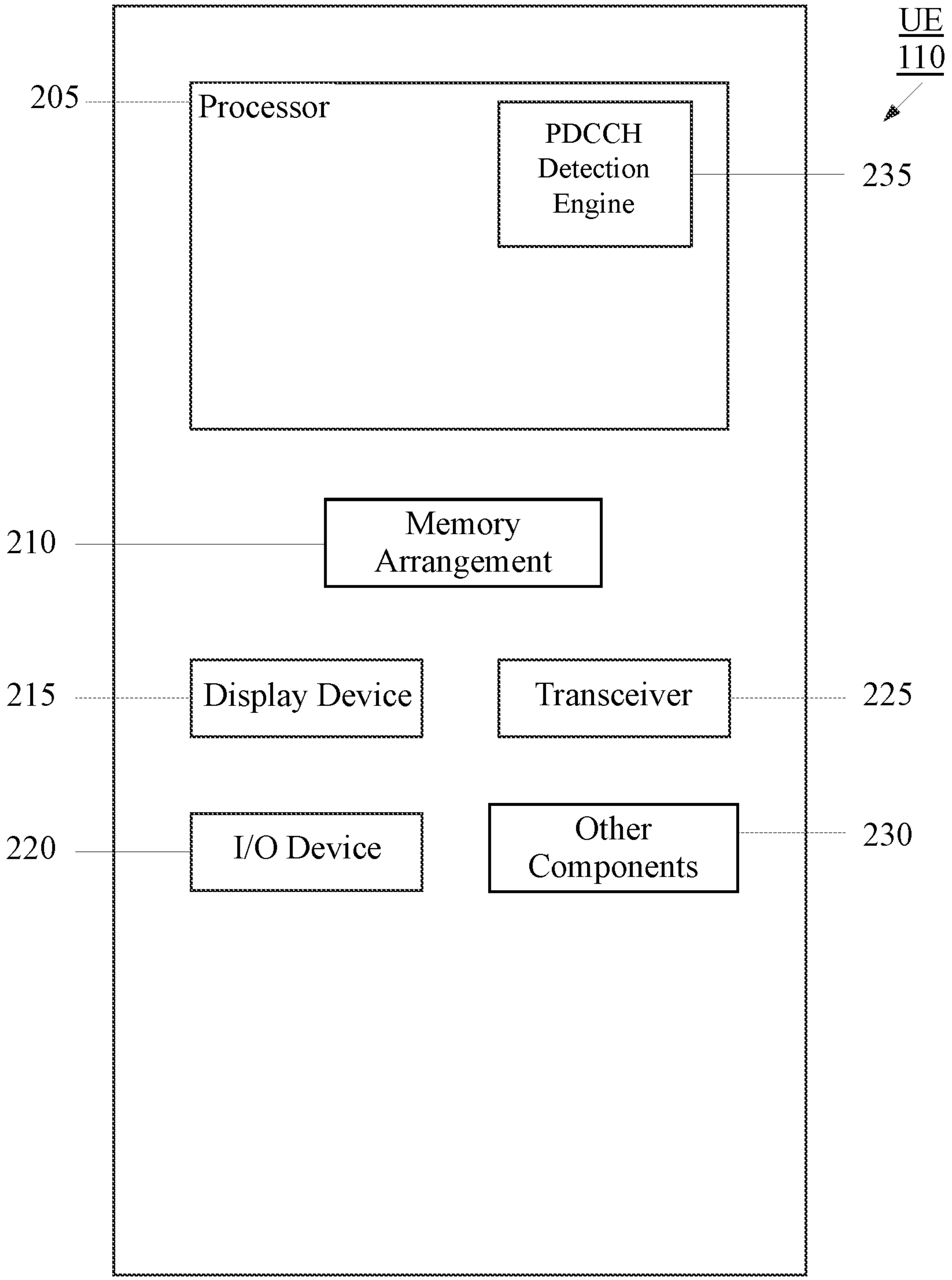
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a PDCCH detection engine 235 for performing operations related to improved DCI decoding. The operations include, but are not limited to, receiving configuration information related to multiple repetitions of DCI in the PDCCH, receiving and decoding multiple repetitions of DCI in the PDCCH, and receiving DCI in the PDSCH. Each of these operations will be described in greater detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
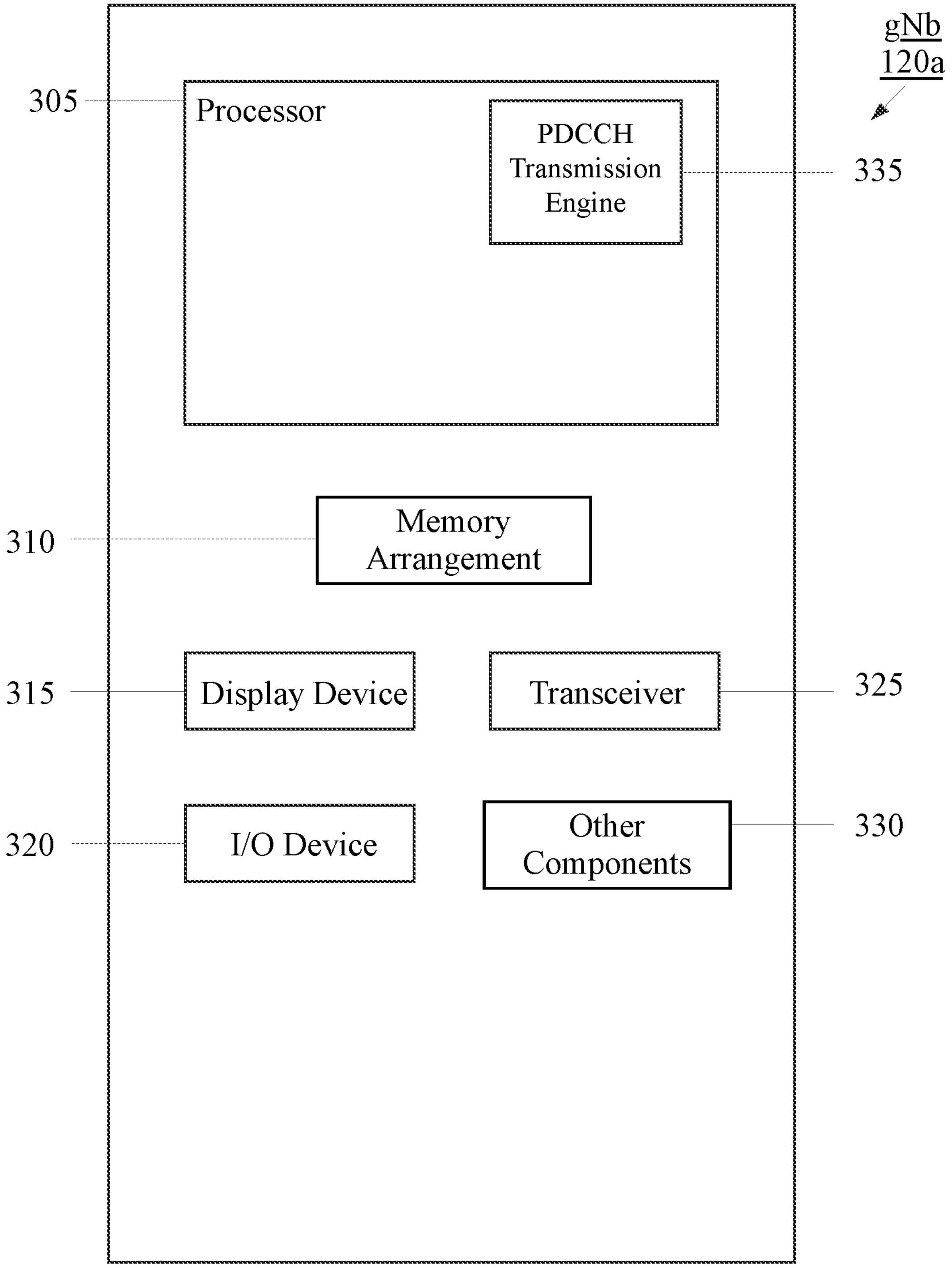
FIG. 3 shows an exemplary base station according to various exemplary embodiments.
Figure 4A:
FIG. 4*a* shows an exemplary Physical Downlink Control Channel (PDCCH) transmission where the same Downlink Control Information (DCI) is transmitted multiple times within a span according to various exemplary embodiments.
Figure 4B:
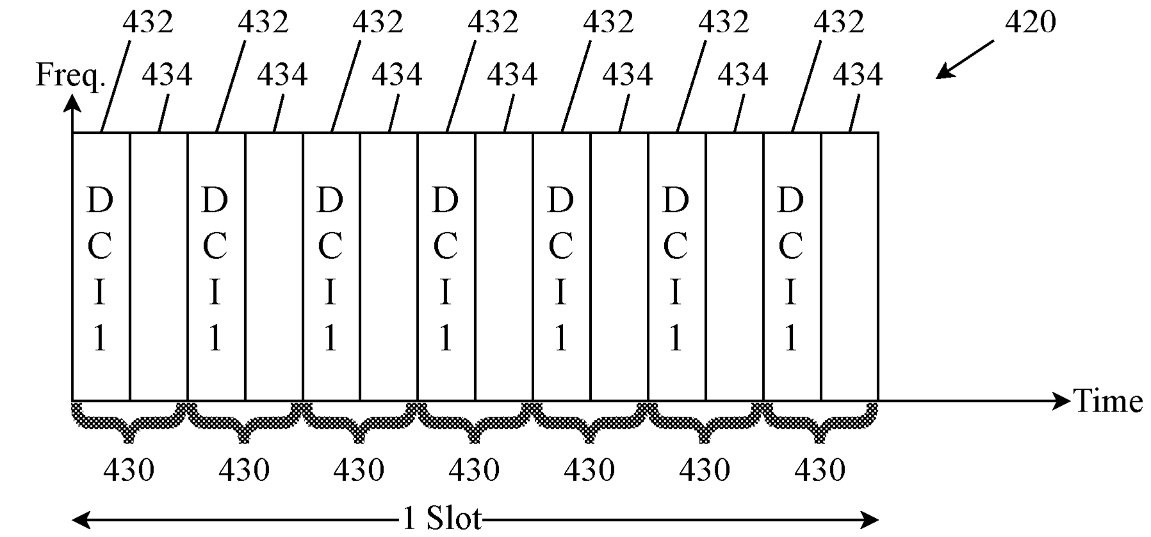
FIG. 4*b* shows an exemplary PDCCH transmission where the same DCI is transmitted in multiple spans inside the same slot according to various exemplary embodiments.
Figure 4C:
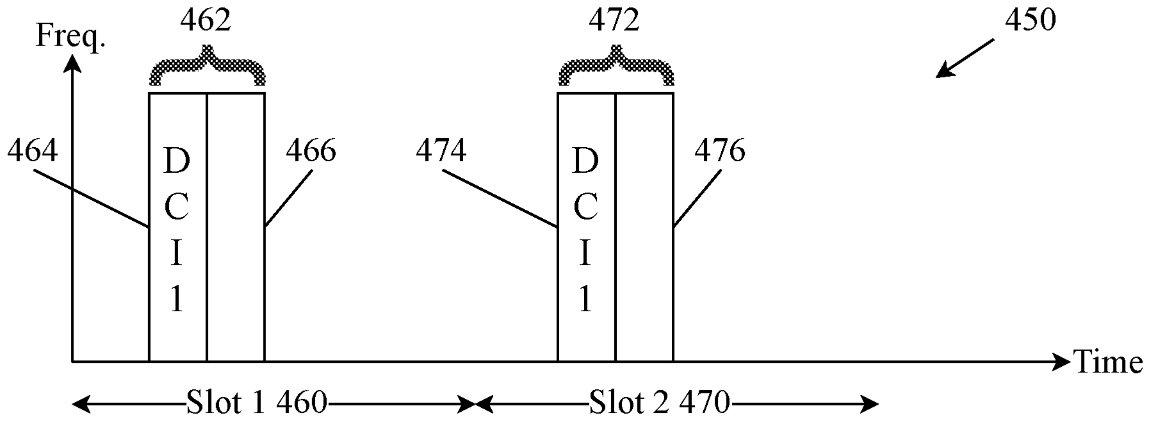
FIG. 4*c* shows an exemplary PDCCH transmission where the same DCI is transmitted in consecutive slots according to various exemplary embodiments.

FIG. 3 shows an exemplary base station, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a PDCCH transmission engine 335 for performing operations related to improved DCI decoding by the UE. The operations include, but are not limited to, configuring the UE to receive and decode multiple repetitions of DCI in the PDCCH, transmitting the multiple repetitions, configuring the UE to receive and decode DCI in the PDSCH and transmitting the DCI in the PDSCH. Each of these operations will be described in greater detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory arrangement 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the network arrangement 100. The transceiver 325 may operate on a variety of different frequencies or channels (e.g., set of consecutive frequencies). Therefore, the transceiver 325 may include one or more components (e.g., radios) to enable the data exchange with the various networks and UEs.

PDCCH Repetition

A control resource set (CORESET) is a set of resource element groups (REG) (each REG comprising a resource block in the frequency domain and one OFDM symbol in the time domain) within which the UE attempts to blindly decode downlink control information (DCI) from the PDCCH. The CORESET may be considered a set of physical resources, e.g., a specific area on the NR downlink resource grid and a set of parameters that is used to carry PDCCH data e.g., downlink control information (DCI).

Each CORESET may have one or more search spaces (SS) defined. The PDCCH search space refers to an area in the downlink resource grid where the PDCCH may be carried. The downlink control channel is transmitted on an aggregation of one or more consecutive control channel elements (CCEs), each CCE comprising multiple resource element groups (REGs), e.g., 6 REGs (72 resource elements (REs)). The number of REs of a control resource set (CORESET) used to carry a PDCCH downlink control information (DCI) message is referred to as an aggregation level (AL) and is expressed in terms of CCEs. There are currently five different PDCCH CCE ALs supported in 5G NR (ALs 1, 2, 4, 8 and 16) specifying the number of CCEs used to carry the PDCCH DCI message.

The PDCCH search space includes a UE-specific search space and a common (cell-specific) search space for the UE to monitor for potential DCI formats, including, e.g., downlink (DL) grants and uplink (UL) grants. The UE-specific search space is configured for the UE via Radio Resource Control (RRC) signaling and is dedicated to the specific UE, while the common search space is targeted to all or at least a group of UEs in the cell having a RRC connection with the network/gNB. A CCE index is the CCE number at which the PDCCH is allocated. For the UE to decode the PDCCH, the UE needs to know the location of the PDCCH (CCE index), structure, scrambling code, etc. However, the UE is not informed of the exact aggregation level (AL) or DCI format for the PDCCH reception. Instead, it is configured with a set of ALs and a number of DCI formats to ensure scheduling flexibility at the gNB side, and thus the UE performs blind decoding throughout the search space to find the PDCCH data (e.g., DCI).

The decoding performance is limited by the code-rate (e.g., message length K and aggregation level). For example, for a 1×1 Additive White Gaussian Noise (AWGN) channel with K=68 and AL=16, a Block Error Rate (BLER)=0.1 is reached at approximately −11 dB. Decoding DCI below that level is not possible with the existing solutions.

Thus, in some exemplary embodiments, PDCCH repetitions may be used to allow decoding the DCI at lower signal to noise ratios (SNRs). At the UE 110, the PDCCH repetitions may be decoded independently or combined (e.g., soft bits from each repetition may be combined) and the combined bits may be decoded. These repetitions may improve the 'observed SNR', and thus improve the decoding capability of the UE 110.

There may be various options to implement PDCCH repetitions, each of which will be described in greater detail below. In a first option, the same DCI is transmitted multiple times within a span. A span is a set of consecutive symbols in a slot for which the UE 110 may be configured to monitor PDCCH candidates. In this option, the same DCI is transmitted multiple times within the same span. Multiple repetitions within the same span may keep the latency minimal.

Throughout this description, the term "same DCI" may be used. This term should be understood to mean when two DCIs have exactly the same payload bits they are the same DCI. However, two DCIs may also be considered to be the "same DCI" even though certain payload bits are different, but still convey the same "information". For example, consider the K0 value in the DCI. K0 indicates the delay between the slot of DCI, and the slot of the corresponding PDSCH. In other words, it informs the UE 110 about the location of the PDSCH. If two DCIs are transmitted in different slots, but they point to the same PDSCH transmission, both DCIs will have different K0 (and different payload bits), but the information they convey is the same, and it is still possible to perform repetition combining. Thus, these two DCIs may still be considered to be the "same DCI."

FIG. **4*a* shows an exemplary PDCCH transmission 400 where the same DCI is transmitted multiple times within a span according to various exemplary embodiments. In this example, a span 410 includes two consecutive symbols 412 and 414 which the UE 110 is configured to monitor for PDCCH candidates. In this example, the same DCI (e.g., DCI 1) is transmitted in both symbols 412 and 414** according to the first option described above.

In a second option, the same DCI is transmitted in multiple spans inside the same slot. A span combination may be defined as (X,Y) where X is the minimum time separation (in symbols) between the first symbol of two consecutive spans and Y is the maximum duration (in symbols) of a given span. The UE 110 will support PDCCH monitoring occasions in any symbol of a slot with the minimum time separation of X symbols between the first symbol of two consecutive spans. It should be understood that the exemplary embodiments are not limited to consecutive spans. To provide one example of the same DCI being transmitted in multiple spans inside the same slot, it may be considered that a UE 110 may be configured with a span combination of (2,2). In this example, 7 repetitions may be possible in a slot with 14 symbols. These repetitions across spans that are inside the same slot may also result in a low latency. In addition, this type of repetition may also allow scheduling the corresponding shared channel (SCH) in the same slot. This example is shown in FIG. **4*b***.

FIG. **4*b* shows an exemplary PDCCH transmission 420 where the same DCI is transmitted in multiple spans inside the same slot according to various exemplary embodiments. Carrying through with the example started above, there are seven (7) spans 430 of two symbols each 432, 434. In this example, the same DCI (e.g., DCI 1) is transmitted in each of the symbols 432 of each of the spans 430** according to the first option described above.

In a third option, the same DCI is transmitted in consecutive slots. As described above, the UE 110 may be configured to support PDCCH monitoring occasions with the minimum time separation of X symbols between the first symbol of two consecutive spans, including across slots. The repetitions across slots may provide a greater diversity gain due to the increased time difference of the repetitions. In this option, the corresponding SCH may be indicated via additional control signaling.

FIG. **4*c* shows an exemplary PDCCH transmission 450 where the same DCI is transmitted in consecutive slots according to various exemplary embodiments. In this example, it may be considered that there are two consecutive slots 460 and 470. Each slot includes a corresponding span 462 and 472 each having two consecutive symbols 464, 466** and 474, 476, respectively, which the UE 110 is configured to monitor for PDCCH candidates. In this example, the same DCI (e.g., DCI 1) is transmitted in the first symbol 464 and 474 of each respective span 462 and 472 of the respective slots 460 and 470 according to the third option described above.

In a fourth option, a combination of two or more of the above three options may be used. For example, the first option of transmitting the same DCI multiple times within a span may be combined with the third option of transmitting the same DCI in consecutive slots. It should be understood that this is only exemplary and any of the PDCCH repetition options described above may be combined with any of the other PDCCH repetition options.

The network (e.g., gNB 120A) may configure the UE 110 to receive and decode the multiple PDCCH repetitions. Thus, in some exemplary embodiments, the current System Information Block 1 (SIB1) may be used to indicate the configuration information for the PDCCH repetition schedule to the UE 110. In other exemplary embodiments, a new SIB format may be used to indicate the configuration information for the repetition schedule to the UE 110. The configuration information may include, for example, the number of repetitions, the time/frequency allocations, an identification of the first and last repetitions, etc. It should be understood that the above configuration information is only exemplary and additional or other types of configuration information may be provided to the UE 110 to allow the UE 110 to understand the repetition schedule.

In some exemplary embodiments, the configuration information may be provided to the UE 110 without requiring the UE 110 to decode a PDCCH. In some examples, a technique may be used where the UE 110 is provided with information or already includes information allowing the UE 110 to find and decode a SIB without receiving a PDCCH. In other examples, the UE 110 may include known information (e.g., location information, cell identification information, PLMN information, etc.), that allows the UE 110 to decode SIB information without prior decoding of a PDCCH.

Figure 5:
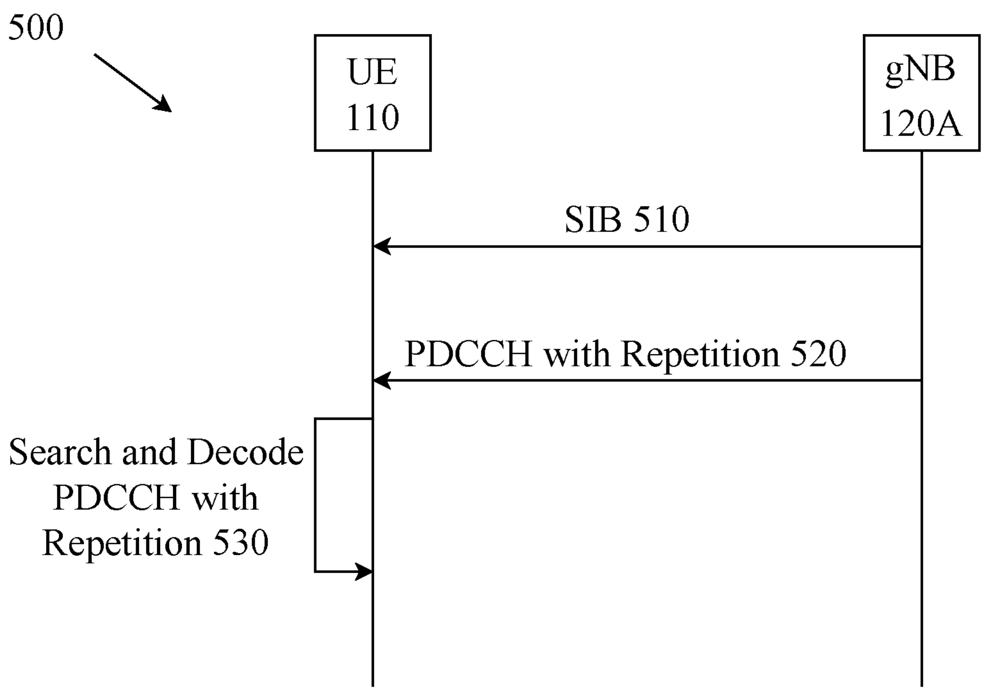
FIG. 5 shows a signaling diagram for configuring a UE with PDCCH repetition configuration information according to various exemplary embodiments described herein.

FIG. 5 shows a signaling diagram 500 for configuring a UE 110 with PDCCH repetition configuration information according to various exemplary embodiments described herein. The signaling diagram 500 includes signaling between the UE 110 and the gNB 120A. As described above, the gNB 120A may transmit a SIB 510 that includes the PDCCH repetition configuration information. As also described above, the UE 110 may receive this SIB 510 without having previously received a PDCCH transmission from the gNB 120A.

The gNB 120A will then transmit the PDCCH with multiple repetitions 520. The UE 110 will receive the PDCCH with multiple repetitions 520 and based on the PDCCH repetition configuration information, the UE 110 may search and decode 530 the correct search space for the PDCCH.

DCI Information in Shared Channel

As described above, the PDCCH is typically the bottleneck for the UE 110 receiving information. For example, in the context of NR, assuming the maximum possible allocations for both the Physical Downlink Shared Channel (PDSCH) and the PDCCH in a given bandwidth (BW), the PDCCH Polar Code performance is worse at low SNRs than the PDSCH LDPC performance, both in terms of waterfall region as well as in terms of waterfall slope. Thus, the PDCCH is the bottleneck for the UE 110 receiving information. Thus, in other exemplary embodiments, instead of using PDCCH repetitions, the DCI may be included in a more robust channel, e.g., the PDSCH.

The PDSCH for the UE 110 may be scheduled semi-persistently via a semi-persistent scheduling (SPS) configuration. Thus, a PDSCH that includes the DCI may be scheduled and known to the UE 110 via the SPS configuration. In the downlink (DL), the SPS is only with grant, the SPS configuration may be defined in Radio Resource Control (RRC) signaling that does not depend on PDCCH decoding.

In addition, since the DCI is mapped to the PDSCH payload, the DCI may be repeated with methods typical to PDSCH, e.g., slot aggregation. Slot aggregation is already defined as part of DL SPS configuration; thus, different repetition values may be used depending on the coverage enhancement (CE) implemented for the UE 110.

In some exemplary embodiments, multiple SPS configurations may be predefined and stored in a table. Then UE 110 may receive a pointer to a table entry (e.g., via a Master Information Block (MIB)) for the UE 110 to understand the SPS configuration that should be used. Again, in this manner, the UE 110 may receive the SPS configuration without any dependence on PDCCH decoding.

DCI Decoding

The following provides information for decoding multiple repetitions of the DCI. In these examples, it is assumed that the multiple repetitions are included in the PDCCH. However, those skilled in the art will understand that the examples may apply equally to multiple repetitions of DCI included in the PDSCH.

An issue with multiple repetitions of the DCI is to properly decode the DCI to uniquely identify a dynamic scheduled grant, e.g., PDSCH. Thus, the DCI repetitions should be defined in a manner allowing the UE 110 to understand this information.

Figure 6:
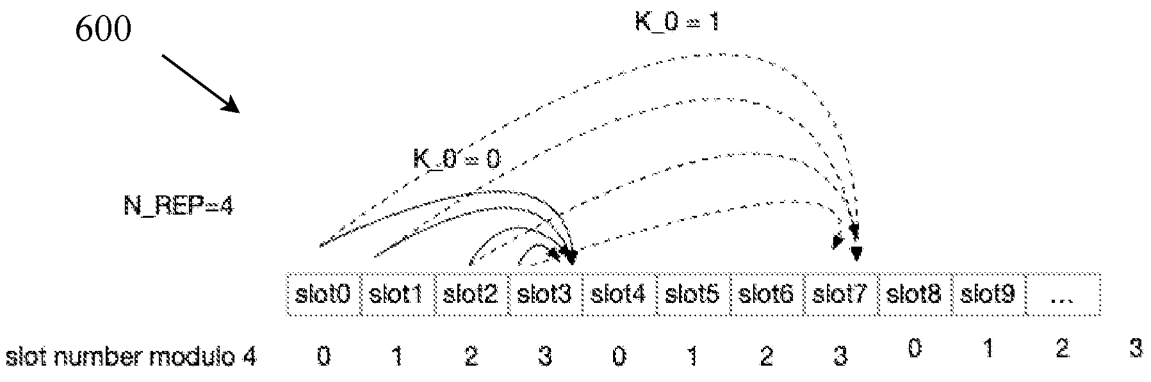
FIG. 6 shows a slot diagram showing exemplary DCI repetition decoding according to various exemplary embodiments.

FIG. 6 shows a slot diagram 600 showing exemplary DCI repetition decoding according to various exemplary embodiments. Initially, it may be considered that identical DCI is repeated in each slot, e.g., K0 stays the same. Those skilled in the art will understand that K0 is the offset between the DL slot where the PDCCH(DCI) for downlink scheduling is received and the DL slot where PDSCH data is scheduled. In the example of FIG. 6, there are two examples, a first example where K0=0 (shown by the solid lines with arrows) and a second example where K0=1 (shown by the dashed lines with arrows). Each of these examples will be described in greater detail below.

In addition, in this example, the number of repetitions is considered to be four (4) as shown by N REP=4. This results in a slot number modulo of 4, e.g., slot repetitions 0-3. It should be understood that the values used are only exemplary and other numbers of repetitions may be used. Those skilled in the art will understand how to modify the examples described herein to apply to other numbers of repetitions.

Figure 7:
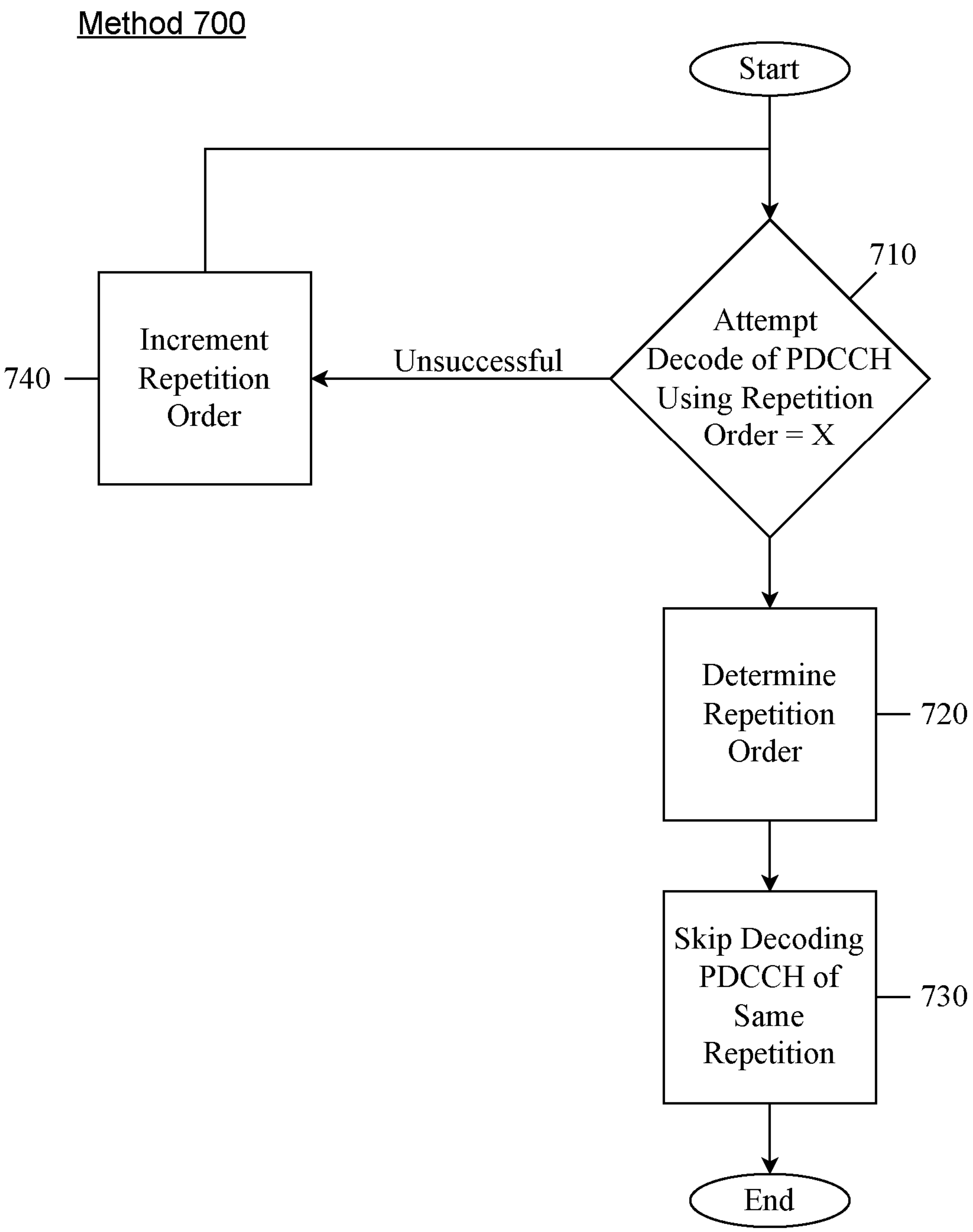
FIG. 7 shows a method showing exemplary DCI repetition decoding according to various exemplary embodiments.

In these examples, to uniquely identify the PDSCH being scheduled, irrespective of which PDCCH sequence is successfully decoded, K0 is interpreted by applying a "slot number modulo repetition order" rule. It should be understood that the DCI content may change every "repetition order" slots. The DCI may also include a repetition order as a field element. The example of FIG. 6 will also be described with reference to the method of FIG. 7. FIG. 7 shows a method 700 showing exemplary DCI repetition decoding according to various exemplary embodiments.

In 710, the UE 110 attempts to decode the PDCCH assuming a repetition order of 1, e.g., the UE 110 attempts to decode the DCI included in the first modulo slots 0-3 of FIG. 6. Some exemplary methods of combining PDCCH information between slots for decoding purposes is described in greater detail below. However, for the purposes of describing the examples of FIGS. 6 and 7, it may be considered whether the decoding is successful or unsuccessful.

If the decoding is successful, in 720, the UE 110 may determine the actual repetition order from the DCI. As described above, the DCI may include a repetition order as a field element. Thus, if any of the DCI in modulo slots 0-3 are successfully decoded using the assumed repetition order of 1, the UE 110 will understand that K0=0. The UE 110 will then understand that the PDSCH has an offset of 0 from the slot in which the DCI is received. Thus, for any of modulo slots 0-3, when K0=0, the PDSCH may be scheduled for slot 3. This is shown as the solid lines from any of the DCI in modulo slots 0-3 to slot 3.

In 730, the UE 110 will skip decoding PDCCH belonging to the same repetition. For example, referring to FIG. 6, it may be considered that the UE 110 successfully decoded the PDCCH included in the first slot 0. Thus, the UE 110 will understand that the UE 110 may skip decoding the PDCCH that is included in slots 1-3 because these are repetitions of the PDCCH that the UE has already decoded.

In contrast, if the PDCCH decoding is not successful using the first assumed repetition order (e.g., repetition order=1), in 740, the UE 110 may increment the repetition order (e.g., repetition order=2) and continue to attempt to decode the PDCCH using the new assumed repetition order. Referring to FIG. 6, when the repetition order is assumed to be 2, the PDCCH may be repeated in the first set of modulo slots 0-3 or the second set of modulo slots 0-3 (slots 4-7). In some exemplary embodiments, PDCCH combination is limited to individual slot groups (e.g., first set of modulo slots 0-3 or the second set of modulo slots 0-3 (slots 4-7)). In other exemplary embodiments, PDCCHs belonging to both slot groups may be combined using a hypothesis approach. This combination across slot groups may also cause a change K0, but those skilled in the art will understand the principles of such combinations.

If the decoding is successful based on the updated repetition order, the UE 110 will repeat the operations of 720 and 730 for the updated repetition order. In the example of FIG. 6, this success for repetition order=2 may allow the UE 110 to understand that K0=1. The UE 110 will then understand that the PDSCH has an offset of 1 from the slot in which the DCI is received. Thus, for any of set of modulo slots 0-3, when K0=1, the PDSCH may be scheduled for the second modulo slot 3 (slot 7). This is shown as the dashed lines from any of the DCI in first set of modulo slots 0-3 to slot 7. While not shown, it should be understood that similar lines may be drawn from each of the second set of modulo slots 0-3 (slots 4-7) to second modulo slot 3 (slot 7).

In 730, similar to the above description, the UE 110 will skip decoding the PDCCH candidate belonging to the same repetition. The UE 110 will continue to cycle through the method 700 until the decoding is successful or the UE 110 runs out of PDCCH candidates.

As described above, information from multiple repetitions of the PDCCH may be combined to successfully decode the DCI. If PDCCH belonging to different slots are combined, the state for each candidate should be maintained between slots to allow combining with log likelihood ratios (LLRs) from subsequent slots. Coverage enhancement features use a highest available AL resulting in the lowest number of candidates per slot. There are at least two options to handle this scenario.

In a first option, each PDCCH candidate sent at the same location (e.g., the same location in multiple slots) results in the number of intermediate candidate states not increasing with repetitions. In this manner, candidates with same index between slots may be combined.

In a second option, repeated PDCCH candidates can be mapped to any location in a subsequent slot. In this case, the number of intermediate candidate states may increase as n_cand_per_slot^nslots.

EXAMPLES

In a first example, a processor of a base station is configured to perform operations comprising transmitting, to a user equipment (UE), physical downlink control channel (PDCCH) configuration information comprising repetitions for PDCCH candidates that comprise Downlink Control Information (DCI), encoding, based on at least the PDCCH configuration information, PDCCH candidates comprising multiple repetitions and transmitting, to the UE, the encoded PDCCH candidates.

In a second example, the processor of the first example, wherein the repetitions for the PDCCH candidates comprise a same DCI transmitted multiple times within a span.

In a third example, the processor of the first example, wherein the repetitions for the PDCCH candidates comprise a same DCI transmitted in multiple spans in a same slot.

In a fourth example, the processor of the first example, wherein the repetitions for the PDCCH candidates comprise a same DCI transmitted in multiple slots.

In a fifth example, the processor of the first example, wherein the PDCCH configuration information comprises one of a number of repetitions, a time or frequency allocation for the PDCCH candidates, or an identification of a first and last repetition of the PDCCH candidates.

In a sixth example, the processor of the first example, wherein the PDCCH configuration information is transmitted via a system information block (SIB).

In a seventh example, the processor of the sixth example, wherein the SIB comprises SIB'.

In an eighth example, the processor of the sixth example, wherein the SIB is received prior to decoding a PDCCH candidate.

In a ninth example, a base station comprising a transceiver configured to communicate with a user equipment (UE) and the processor of any of the first through eighth examples communicatively coupled to the transceiver.

In a tenth example, a processor of a base station is configured to perform operations comprising transmitting, to a user equipment (UE), semi-persistent scheduling (SPS) configuration information for a physical downlink shared channel (PDSCH), encoding a PDSCH comprising Downlink Control Information (DCI) and transmitting, to the UE, the encoded PDSCH.

In an eleventh example, the processor of the tenth example, wherein the SPS configuration information is transmitted via radio resource control (RRC) signaling.

In a twelfth example, the processor of the tenth example, wherein the PDSCH comprises multiple PDSCH and each PDSCH comprises a repetition of the DCI.

In a thirteenth eleventh example, the processor of the twelfth example, wherein the SPS configuration information comprises PDSCH slot aggregation information associated with the repetitions of the DCI, wherein a number of the repetitions is based on a coverage enhancement (CE) level of the UE.

In a fourteenth example, the processor of the tenth example, wherein the SPS configuration information comprises a pointer to a table entry indicating an SPS configuration the UE is to use.

In a fifteenth example, the processor of the fourteenth example, wherein the pointer is transmitted via a Master Information Block (MIB).

In a sixteenth example, a base station comprising a transceiver configured to communicate with a user equipment (UE) and the processor of any of the tenth through fifteenth examples communicatively coupled to the transceiver.

Those skilled in the art will understand that the above-described exemplary embodiments may be implemented in any suitable software or hardware configuration or combination thereof. An exemplary hardware platform for implementing the exemplary embodiments may include, for example, a desktop platform having an operating system, a mobile device having an operating system. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a base station configured to perform operations comprising:
- transmitting, to a user equipment (UE), physical downlink control channel (PDCCH) configuration information comprising repetitions for PDCCH candidates that comprise Downlink Control Information (DCI), wherein the repetitions for the PDCCH candidates comprise a same DCI that is transmitted multiple times during consecutive symbols of a same slot;
- encoding, based on at least the PDCCH configuration information, PDCCH candidates comprising multiple repetitions; and
- transmitting, to the UE, the encoded PDCCH candidates.

2. The processor of claim 1, wherein the PDCCH configuration information comprises an identification of a first and last repetition of the PDCCH candidates.

3. The processor of claim 1, wherein the PDCCH configuration information is transmitted via a system information block (SIB).

4. The processor of claim 3, wherein the SIB comprises SIB1.

5. The processor of claim 3, wherein the SIB is received prior to decoding a PDCCH candidate.

6. The processor of claim 1, wherein the PDCCH configuration information comprises a number of repetitions.

7. The processor of claim 1, wherein the PDCCH configuration information comprises a time or frequency allocation for the PDCCH candidates.

8. A base station comprising:
- a transceiver configured to communicate with a user equipment (UE); and
- one or more processors communicatively coupled to the transceiver and configured to:
  - transmit, to the UE, physical downlink control channel (PDCCH) configuration information comprising repetitions for PDCCH candidates that comprise Downlink Control Information (DCI), wherein the repetitions for the PDCCH candidates comprise a same DCI transmitted in a first symbol of each of multiple spans within a same slot, wherein each span comprises at least two symbols;
  - encoding, based on at least the PDCCH configuration information, PDCCH candidates comprising multiple repetitions; and
  - transmitting, to the UE, the encoded PDCCH candidates.

9. The base station of claim 8, wherein the PDCCH configuration information comprises an identification of a first and last repetition of the PDCCH candidates.

10. The base station of claim 8, wherein the PDCCH configuration information is transmitted via a system information block (SIB).

11. The base station of claim 10, wherein the SIB comprises SIB1.

12. The base station of claim 10, wherein the SIB is received prior to decoding a PDCCH candidate.

13. The base station of claim 8, wherein the PDCCH configuration information comprises a number of repetitions.

14. The base station of claim 8, wherein the PDCCH configuration information comprises a time or frequency allocation for the PDCCH candidates.

15. A method comprising:
- at a base station:
  - transmitting, to a user equipment (UE), physical downlink control channel (PDCCH) configuration information comprising repetitions for PDCCH candidates that comprise Downlink Control Information (DCI), wherein the repetitions for the PDCCH candidates comprise a same DCI transmitted in a first symbol of a first span of symbols in a first slot and in a first symbol of a second span of symbols in a second slot;
  - encoding, based on at least the PDCCH configuration information, PDCCH candidates comprising multiple repetitions; and
  - transmitting, to the UE, the encoded PDCCH candidates.

16. The method of claim 15, wherein the PDCCH configuration information comprises an identification of a first and last repetition of the PDCCH candidates.

17. The method of claim 15, wherein the PDCCH configuration information is transmitted via a system information block (SIB).

18. The method of claim 17, wherein the SIB comprises SIB1.

19. The method of claim 17, wherein the SIB is received prior to decoding a PDCCH candidate.

20. The method of claim 15, wherein the PDCCH configuration information comprises a number of repetitions.

21. The method of claim 15, wherein the PDCCH configuration information comprises a time or frequency allocation for the PDCCH candidates.

* * * * *